United States Patent [19]
Fickel

[11] 3,888,743
[45] June 10, 1975

[54] DISTILLATION COLUMN REBOILER SECTION WITH INTERNAL FLOW SENSING MEANS

[75] Inventor: R. Gene Fickel, Roselle, Ill.

[73] Assignee: Universal Oil Products Company, Des Plaines, Ill.

[22] Filed: Apr. 11, 1974

[21] Appl. No.: 459,974

[52] U.S. Cl. .................................................. 202/158
[51] Int. Cl. .............................................. B01d 3/14
[58] Field of Search ........ 202/158, 206, 160; 203/1, 203/DIG. 18; 196/132, 100; 208/DIG. 1

[56] References Cited
UNITED STATES PATENTS
2,849,386  8/1958  Gilmore .............................. 202/153

Primary Examiner—Norman Yudkoff
Assistant Examiner—Frank Sever
Attorney, Agent, or Firm—James R. Hoatson, Jr.; Robert W. Erickson; William H. Page, II

[57] ABSTRACT

A reboiler section for a distillation, or fractionation column having internally-disposed flow-measuring means. The flow-measuring means determine the quantity of vapor passing upwardly from the reboiler section into the fractionation section of the column (stripping and rectification). Signal-sensing means are utilized for transmitting a signal, representative of the rate of vapor flow through the flow-measuring means, without the confines of the reboiler section.

7 Claims, 3 Drawing Figures

PATENTED JUN 10 1975 3,888,743

DISTILLATION COLUMN REBOILER SECTION WITH INTERNAL FLOW SENSING MEANS

APPLICABILITY OF INVENTION

As herein described, my inventive concept encompasses the design of the reboiler section of a continuousflow distillation column, or fractionation column. In the present specification, as well as in the appended claims, the use of the term "distillation column" synonymously alludes to "fractionation columns," "rerun column," "stripping columns," "extractive-distillation columns," etc. Similarly, for the purposes of describing the present invention, the "reboiler section" of a distillation column connotes that portion which is disposed below the lowermost tray, or deck. That portion of the column above the lowermost tray is herein referred to as the "fractionation section," and is inclusive of the rectification zone (above the feed tray) and the stripping zone (below the feed tray).

As recognized by those possessing the requisite expertise in the appropriate art, a reboiler section is utilized in the reboiling of a distillation column in order to circulate a hot liquid bottoms fraction from the reboiler section through a reboiler heater, wherein at least a portion of the liquid is vaporized; the heated, mixed-phase bottoms material is returned to the reboiler section, thereby supplying heat to the column. The vapors pass upwardly from the reboiler section into the fractionation section wherein they serve to remove lower-boiling constituents from the liquid phase traversing the column in downward flow. A most important aspect to be considered with respect to the efficient operation of a distillation column, resides in thermal balance. Although many operating variables have an effect upon thermal balance, that of heat input via the reboiler section is perhaps the most pronounced. Control of the heat input to the reboiler section is generally the most difficult to achieve to the degree necessary for substantially stable thermal balance.

The foregoing is applicable to reboiler operation considerations regardless of the precise boiling range of the circulating reboiler liquid bottoms material; however, the difficulties attendant reboiler heat input control become more pronounced when the reboiler liquid is a pure compound, or exhibits a relatively narrow boiling range of about 10°F., or less. Heat input by way of circulating reboiler liquid takes two forms: (i) the increased sensible heat of the liquid passing back into the reboiler section and, (ii) the latent heat of vaporization absorbed by the vapors which are generated in the reboiler heater. The latent heat of vaporization constitutes the major source of heat input to the reboiler section, and, of necessity, therefore, must be subject to close control and/or regulation.

Briefly, the reboiler section design of the present invention is intended to achieve accurate measurement of the quantity of vapors returned to the reboiler section of a distillation column, and which flow upwardly into the fractionation section. This is accomplished by flow-measuring means disposed within one side of a partitioned reboiler section having two bottoms liquid inventory chambers.

OBJECTS AND EMBODIMENTS

A principal object of the present invention is to provide means for the direct measurement of the flow of vapors from the reboiler section into the fractionation section of a distillation column. A corollary objective is directed to a reboiler design which enhances the control of heat input to a distillation column.

A specific object of my invention is to afford the measurement of vapor flow in a substantially liquid-free environment.

Therefore, an one embodiment, my invention encompasses a reboiler section for a distillation column which comprises, in combination: (a) a chordal baffle vertically disposed in said reboiler section, connected at its lower end to the bottom of said column and terminating, at its upper end, a finite distance below the lowermost tray, or deck of said column, thereby forming two segmental bottom chambers in said reboiler section; (b) a first fluid outlet port in the bottom of the first of said two chambers, and a fluid inlet port in open communication with the second of said chambers; (c) flow-measuring means within said second chamber, and disposed at the upper end thereof; and, (d) signal-sensing means, in open communication with said flow-measuring means, for transmitting a signal, representative of the rate of flow through said flow-measuring means, without the confines of said reboiler section.

Other objects and embodiments, encompassed by the present inventive concept, will become evident from the following, more detailed description of the reboiler section. For example, another object of the present invention is to permit the measurement of vapor flow into the fractionation section in a substantially liquid-free environment. To this end, one embodiment involves an imperforate second baffle being disposed in the reboiler section at a locus between the lowermost tray and the flow-measuring means, the second baffle extending horizontally from said second chaamber a distance less than the internal diameter of the fractionation column.

SUMMARY OF INVENTION

Distillation operations and techniques are extensively employed throughout the petroleum and petrochemical industries for the separation and recovery of select fractions of the charge stock, or of substantially pure compounds. For example, in a process for the catlytic reforming of naphtha fractions, the normally liquid portion of the reaction zone effluent is "rerun," often to provide a light gasoline, a heavy gasoline and a bottoms fraction, all of which have relatively wide boiling ranges. In a solvent-extraction process, wherein polar hydrocarbons are separated from a mixture thereof with non-polar hydrocarbons, the ultimately recovered product has a relatively narrow boiling range, and its distillation characteristics are substantially similar to pure compounds. Although applicable to both types of distillation operations, my invention is most advantageously employed where the column bottoms fraction, a portion of which serves as the circulating reboiler heating medium, is a pure compound, or a narrow boiling range mixture.

Briefly, the reboiling technique is employed to regulate the quantity of fuel input to the external reboiler heater, in order to adjust the heat input to the reboiler section of the distillation column through the control of the amount of vaporous material required for thermal equilibrium and the accompanying desired separation efficiency. It is recognized that the published literature is replete with a wide variety of techniques designed to control the quantity of heat input to the reboiler section of a distillation column. In view of the voluminous nature of such techniques, no attempt will be made herein to delineate exhaustively the appropriate prior art.

One popular and ancient prior art technique, now improved upon, involves an energy balance around the external reboiler heater; a similar scheme computes the energy balance around the reboiler section of the distillation column. Although affording a small measure of control, both of these techniques entail too many measurements accompanied by extremely difficult, tedious energy balances, and are comparatively inefficient. Other techniques involve controlling the flow of heating medium to the external heater responsive either to the temperature of the heated material returned to the reboiler section, or to the flow rate thereof. In both such situations, the quantity of liquid reboiler bottoms material introduced into the external heater is pre-set by way of flow control means. Flow control of the heated material re-entering the reboiler section suffers from the disability of not being capable of distinquishing between liquid and vapor. Temperature control will generally suffice acceptably in situations where the reboiler liquid has a relatively wide boiling range, but fails miserably where the liquid is either a substantially pure compound, or possesses a comparatively narrow boiling range.

As previously indicated, the important criterion is the degree of vaporization in the heated mixed-phase material returning to the reboiler section. This is particularly critical with respect to substantially pure reboiler bottoms material. Correlations of energy, or heat content versus temperature, at given vaporization percentages, indicate a comparatively large delta-T per unit of heat content, as the percent vaporization increases where the liquid reboiler bottoms has a relatively wide boiling range. Therefore, a measurable change in temperature will indicate a significant change in vaporization, and thus a change in the thermal balance of the column. These changes can be sensed and transmitted to reset the flow of fuel to the reboiler heater so that more or less liquid will be vaporized and the column can be held in close proximity to thermal equilibrium. However, temperature control, or flow control in the return conduit is not satisfactorily effective when the reboiler bottoms liquid is a substantially pure compound, or one possessing a narrow boiling range. The correlations described above indicate that very little (if any) delta-T is available for percentage vaporization determination. That is to say, temperature measurement in any portion of either the reboiler heater circuit, or the lower reboiler section, does not indicate an accurate degree of vaporization. The temperature will remain virtually the same whether excess vapor, or insufficient vapor, is being generated in the reboiler heater.

Likewise, when a pure compound, or narrow boiling range component mixture, is being reboiled, temperature control on the fuel input to the reboiler heater is not feasible due to the effect of pressure variation within the distillation column. A shift in column pressure will produce a corresponding shift in the boiling temperature of the pure compound, or in the vapor temperature of the narrow boiling range mixture, without noticeably affecting the rate or degree of vaporization. Thus, a change in column pressure will produce a temperature change which is not truly indicative of a change in the reboiling function.

Precise control of thermal balance and separation efficiency can be achieved through an accurate measurement of the quantity of vapors actually leaving the reboiler section to flow upwardly through the fractionation section of the distillation column. The present invention accomplishes this by providing a novel reboiler section design which permits direct, internal measurement of the flow of generated vapors upwardly through the column. A signal, representative of the quantity of vapor passing into the fractionation section can be transmitted to heat-varying means for adjustment, or regulation of the heat input of the reboiler heater. This internal measurement of the flow of vapors is extremely accurate and sensitive in view of the fact that it is accomplished within the reboiler section in a substantially liquid-free environment.

Examples of processes, wherein the separation and recovery of a pure compound, a relatively wide boiling range fraction, or a narrow boiling range mixture forms an integral part, and to which the present invention may be advantageously applied, include, but not by way of limitation: (i) the recovery of styrene from an ethylbenzene dehydrogenation system; (ii) the separation of one xylene isomer from a mixture thereof with other xylene isomers; (iii) aromatic hydrocarbon separation from a mixture thereof with non-aromatic hydrocarbons; (iv) the separation and recovery of ethylbenzene from a mixture thereof with various xylene isomers; and, (v) the catalytic reforming of hydrocarbons, etc. The particular use to which the reboiler section of the present invention is put, is not considered a feature limiting upon the scope and spirit of the present invention as defined by the appended claims.

For the purpose of additional illustration, as well as the description of the accompanying drawing, further discussion will be restricted to the integration of the present reboiler section design into a process for the selective extraction of aromatic hydrocarbons from a mixture thereof with non-aromatic hydrocarbons. One such process involves extractive distillation of the mixed hydrocarbonaceous feed stream with a water-soluble solvent which is selective for the adsorption of aromatic hydrocarbons — e.g. a sulfolane-type solvent. Extractive distillation conditions include a water content, in the solvent stream, of about 0.5 to about 20.0 percent by weight, a solvent to feed ratio of about 2.0:1.0 to 6.0:1.0, a distillation column pressure ranging from 90 mm. Hg., absolute, to about 40.0 psig., an overhead temperature from about 130°F. to about 330°F. and a reboiler bottoms temperature from about 170°F. to about 355°F. There is provided a rich liquid extract stream relatively free from non-aromatics and comprising solvent and aromatic hydrocarbons, and an overhead vaporous raffinate comprising non-aromatics, water (as steam) and a relatively minor quantity of the sulfolane solvent. The raffinate is condensed and water-washed to recover substantially solvent-free non-aromatics. The aromatic hydrocarbons contained in the extract phase are recovered in a solvent recovery column of the variety well known and thoroughly described in the appropriate literature. Steam is employed as a stripping medium to separate aromatic hydrocarbons from the solvent. An overhead product of aromatics and steam, substantially free from solvent, is condensed to recover the final extract product. The water is generally returned to the process via the raffinate water-wash column. Aromatic hydrocarbon recovery generally exceeds 96.5 percent by volume, based upon the charge stock, and the purity is greater than 99.0 percent.

BRIEF DESCRIPTION OF DRAWINGS

In the accompanying drawing.

DETAILED DESCRIPTION OF DRAWING

Figure 1:
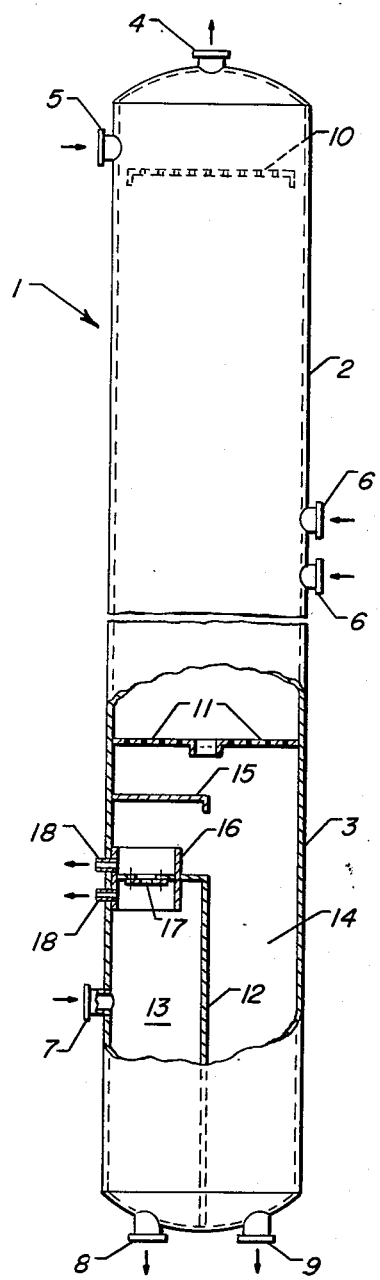
FIG. 1 is a partially-sectioned elevation of an extractive distillation column 1 having an uppermost tray 10 and a lowermost tray 11. The actual number of trays, or decks, within the distillation column, as well as the particular design thereof, is not germane to the design of the reboiler section in accordance with the present inventive concept.

Extractive distillation column 1 consists of two principal sections, fractionation section 2, located above lowermost tray 11, and reboiler section 3, located below tray 11. The column contains from about 10 to 100 trays, excluding the reboiler section which is often considered in the art as a "tray." vaporous raffinate, rich in non-aromatic hydrocarbons, is withdrawn overhead via outlet port 4. The sulfolane solvent is introduced, just below uppermost tray 10, through inlet port 5. Illustrated are two hydrocarbon inlet ports 6 which are physically located above trays 32 and 36 (for descriptive purposes, it will be presumed that column 1 consists of 66 decks, 33 each of decks 10 and 11 in alternating configuration). In most fractionation operations, the column is provided with more than one feed inlet port in order to afford flexibility with respect to the stripping zone and rectification zone; the actual number is not essential to this invention.

Reboiler section 3 is partitioned by chordal baffle 12 to provide two segmental sections 13 and 14 which serve as liquid bottoms inventory chambers. A solvent-rich stream, containing aromatic hydrocarbons, is withdrawn on liquid level control through outlet port 9, and introduced into an external reboiler heater, either direct-fired, or of the heat-exchanger type. Fuel input to the reboiler heater is adjusted to provide the proper amount of heat, consistent with the degree of vaporization necessary to maintain thermal balance and separation efficiency. The heated, mixed-phase bottoms material is returned to reboiler section 3 through inlet port 7 which is in open communication with inventory chamber 13. Solvent and aromatic hydrocarbons are withdrawn from chamber 13, on liquid level control, through outlet port 8, and sent to suitable solvent recovery facilities. Solvent is returned to column 1 through inlet port 5.

In the embodiment shown in FIG. 1, it will be noted that vertically-disposed chordal baffle 12 is installed as a plane containing the center line, or axis, of column 1, and thus provides chambers 13 and 14 of substantially equal volume. The two chambers are obviously not equal in volume in view of the fact that the flow-measuring means is situate at the upper end of chamber 13. Flow-measuring means as shown comprises an orifice plate 17 within an abbreviated riser 16. While riser 16 is not essential, it constitutes a preferred integral part of the measuring means; the length of riser 16 above and below orifice 17 is also not essential to the invention, or to its mode of operation. Orifice taps 18, in open communication with the orifice plate 17, through riser 16, permit a signal representative of the vapor flow through orifice 17, and thus from the reboiler section upwardly through tray 11 into the fractionation section to be transmitted to receiving means (not illustrated) outside the confines of the distillation column which, in turn, regulates the fuel input to the external reboiler heater.

To assure that the vapor-flow measurement is effected in a substantially liquid-free environment, horizontal baffle (imperforate) 15 is disposed between lowermost tray 11 and the orifice plate 17, but is not in contact with either the latter, or with riser 16. In effect, baffle 15 serves as a quasi riser cap, extending horizontally past the riser, thereby preventing liquid from tray 11 from flowing into riser 16. Inlet port 7 introduces the heated mixed-phase into chamber 13 at a locus which is about one-half to two-thirds the distance from the bottom of column 1 to orifice plate 17. The liquid portion of the mixed-phase will, therefore, fall into the lower portion of chamber 13, being ultimately withdrawn therefrom through outlet port 8.

Figure 2:
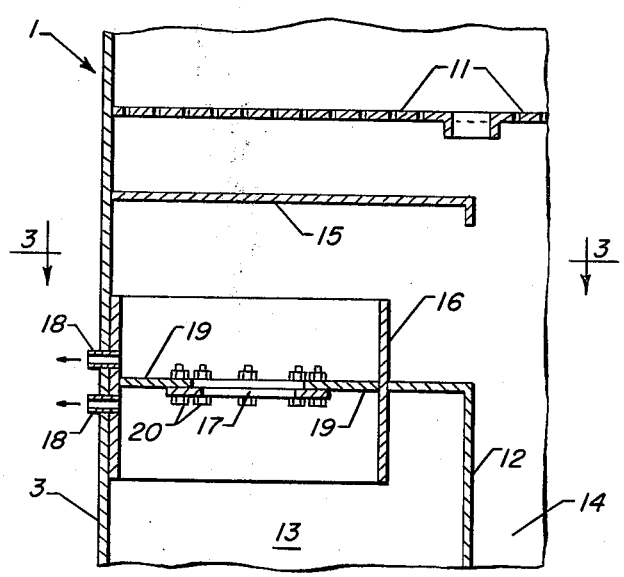
FIG. 2 is an enlarged sectional view of the internally disposed flow-measuring means located below lowermost tray 11.
Figure 3:
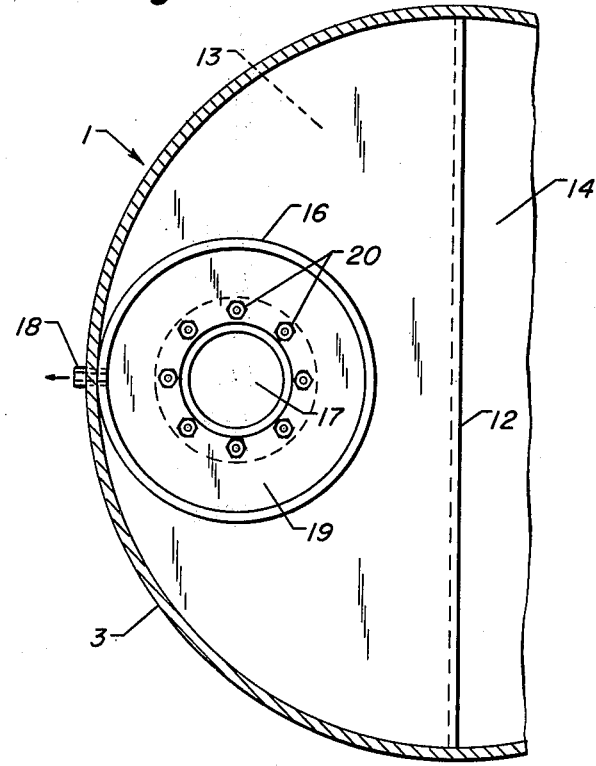
FIG. 3 is a sectioned plan view taken along the line 3—3 of FIG. 2.

FIG. 2 is an enlarged sectioned view of a portion of the reboiler section 3, and illustrates the integrated configuration of chordal baffle 12, riser 16, orifice 17, riser cap 15 and lowermost tray 11. In a typical installation, orifice plate 17 will be attached to annular plate 19 via bolts 20. This permits increasing, or decreasing the size of the orifice as required. FIG. 3 is a sectioned plan view taken along the line 3—3 of FIG. 2, and illustrates the preferred substantially circular shape of riser 16, orifice 17 and annular plate 19, and the spacial relationship thereof with vertically-disposed baffle 12.

Through the use of the present invention, whereby an accurate reboiler heat input measurement is provided, accompanied by virtually instantaneous recovery from fluctuations in operating variables, a distillation column is readily maintained in thermal balance and stable separation efficiency is thus afforded.

I claim as my invention:

1. A reboiler section adapted to be disposed within a distillation column which comprises, in combination:
   a. a chordal baffle vertically-disposed in said reboiler section, connected at its lower end to the bottom of said column and terminating, at its upper end, a finite distance below the lowermost tray, or deck of said column, thereby forming two segmental bottom chambers in said reboiler section;
   b. a first fluid outlet port in the bottom of the first of said two chambers, and a fluid inlet port in open communication with the second of said chambers;
   c. flow-measuring means responsive to upward flowing vapors leaving said reboiler section within said second chamber, and disposed at the upper end thereof;
   d. signal-sensing means, in open communication with said flow-measuring means, for transmitting a signal, representative of the rate of flow through said flow-measuring means, without the confines of said reboiler section; and,
   e. an imperforate second baffle disposed between said lowermost tray and said flow-measuring means, said second baffle extending horizontally from said second chamber a distance less than the internal diameter of said column.

2. The reboiler section of claim 1 further characterized in that a second fluid outlet port is disposed in the bottom of said second chamber.

3. The reboiler section of claim 1 further characterized in that said fluid inlet port is at a locus one-half to two-thirds the distance from the bottom of said column to said flow-measuring means.

4. The reboiler section of claim 1 further characterized in that said flow-measuring means is an orifice plate.

5. The reboiler section of claim 4 further characterized in that said orifice plate is contained within an open ended riser.

6. The reboiler section of claim 5 further characterized in that said second baffle is disposed a finite distance above the upper end of said riser and extends horizontally across the nominal internal diameter thereof.

7. The reboiler section of claim 1 further characterized in that said chordal baffle forms two segmental bottoms chambers of substantially equal volume.

* * * * *